United States Patent Office

2,882,126
Patented Apr. 14, 1959

2,882,126

CHEMICAL PROCESS

Lawrence Paul Conrad, Akron, and John Grant Hazel, Barberton, Ohio, assignors to Columbia-Southern Chemical Corporation No Drawing. Application November 18, 1954
Serial No. 469,840

8 Claims. (Cl. 23—90)

This invention relates to a novel method of removing impurities which are present in commercial calcium chloride. Calcium chloride normally is prepared by the ammonia-soda or Solvay process in which ammonia, carbon dioxide, and salt are reacted in aqueous solution to produce sodium bicarbonate and ammonium chloride. After removal of the sodium bicarbonate, the ammonium chloride is reacted with lime in order to release the ammonia and generate calcium chloride. This calcium chloride is then concentrated, usually to a concentration of about 40 percent, and precipitated salts, such as sodium chloride and the like, are then removed from the aqueous solution. Thereafter, the aqueous solution is either used as such or is further concentrated.

Conveniently, the calcium chloride may be concentrated to approximately 55 percent concentration and shipped to commercial users in tank cars. Alternatively, the calcium chloride may be concentrated to solid state, flaked, and sold for commercial use in the flaked state.

Prior to the present invention, calcium chloride thus produced has had a poor color. Thus, while the initial calcium chloride solution obtained from reaction of lime with ammonium chloride is relatively clear and colorless, upon evaporation of the solution to an elevated concentration, for example, 40 percent or above, the calcium chloride appears as a very dark or even black color due to the presence of finely divided, suspended solids of essentially colloidal size.

This problem cannot be satisfactorily solved by ordinary filtration. While some portion of this black contamination can be removed by filtration, further amounts of this material are precipitated and the filtered solution tends to become darkened on further standing or on further concentration.

According to the present invention it has been found that the black or dark contamination which is present in such calcium chloride can be readily removed by heating the calcium chloride solution at an elevated temperature and while the solution is in liquid state for a substantial period of time. The time of heating required depends to a degree upon the temperature of the heating. At all events, it should be substantially longer than the period of time that is required to effect evaporation of the liquor to 40 or 55 percent concentration. In general, the solution should be aged for a period in excess of one hour, and preferably in excess of 6 to 12 hours (including time the solution is heated during concentration), at a temperature above about 50° C., preferably above 75° C. Normally, heating for at least one hour without appreciable concentration is necessary since otherwise the solution becomes so concentrated that calcium chloride precipitates. Agitation of the solution delays the coagulation and/or precipitation. Hence, where the solution undergoing heating is agitated, the heating period required is lengthened. Thus, at least a portion of the heating is conducted at a temperature below the boiling point or under conditions such that vapors escaping are condensed and returned, i.e., heating under reflux. In consequence of the aging, this dark contamination becomes completely precipitated from the solution while the calcium chloride is in liquid state and the precipitated contamination is in a filterable state. The material thus precipitated may be readily removed by convenient settling and/or filtration. Following this, the resulting calcium chloride may be further concentrated to a concentration where it becomes solid at atmospheric temperatures, for example, 70 to 78 percent concentration by weight, or the solution may be used, stored, or shipped commercially as an aqueous concentrated solution.

In the practice of the process, the aging herein contemplated preferably is conducted after concentration of the calcium chloride solution to above about 40 percent by weight and after removal of precipitated salts, such as sodium chloride, from the solution. Conveniently, the solution undergoing the aging herein contemplated may have a concentration ranging from 40 to 60 percent calcium chloride.

The following are illustrative embodiments of the invention:

EXAMPLE I

The solution subjected to treatment is calcium chloride solution prepared in the conventional way by practice of the Solvay process of producing sodium bicarbonate and sodium carbonate as described above. This solution typically contains about 128 grams of calcium chloride, 63 grams of sodium chloride, 0.86 gram of calcium oxide, and 0.0003 gram of iron per liter of solution. This liquor is run through a series of settling tanks at room temperature in order to remove precipitated solids and then is introduced into an evaporator where the solution is heated at a temperature of 90° C. and the concentration is increased to about 40 percent by weight of calcium chloride. The estimated retention time in the concentrator is about 4 hours. The sodium chloride which is precipitated is then settled from this solution. The remaining liquor is evaporated from 40 to 55 percent concentration at a temperature of 130° C. by feeding the liquor to a conventional evaporator, the retention time in the evaporator being approximately 2 hours. Thereafter, the resulting liquor which contains the black or dark colored impurity above described is stored without agitation in a tank at a temperature of about 127° C. for 3 to 7 days. During this period, no substantial concentration of the solution takes place. The resulting liquid is then filtered in a conventional filter using alpha floc as a filter aid.

The exact chemical nature of the impurity which is precipitated and removed by the filtration described in the above example is not known. Spectroscopic analysis for metallic components shows the presence of major quantities of calcium, magnesium, copper, and iron, and minor amounts of manganese, silicon, aluminum, nickel, barium, and strontium. These impurities are not in the metallic state but are in chemical combination of undetermined character.

The following is a typical analysis:

| | Percent by weight |
|---|---|
| Iron | 10.90 |
| Calcium | 21.39 |
| Sulphur | 16.95 |
| Balance | 50.76 |

EXAMPLE II

A series of laboratory experiments were performed using a quantity of the calcium chloride liquor produced from the Solvay process, such as referred to in Example I. A quantity of this solution was evaporated to 40 percent calcium chloride by weight and the sodium chloride was removed. Thereafter, the solution was evaporated in an open pan evaporator to a calcium chloride concentration of 55 percent by weight. Samples of the solution thus prepared having approximately 500 cc. to 1000 cc. volume were stored at the temperature and for the time set forth in the table below. Following the storage, the liquor was filtered and then evaporated to the concentration set forth in the table below and the color of the flake obtained therefrom was observed. The results which were obtained are set forth in the following table:

Table I.—Open pan liquor

| Sample No. | Storage Temp., °C. | Storage Time, Hours | Flake Color | Percent $CaCl_2$ by weight Solution basis | Percent iron by weight Anhydrous basis |
| --- | --- | --- | --- | --- | --- |
| 1 | 68 | 1 | Poor | 75.7 | 0.0011 |
| 2 | 68 | 7 | Poor | 72.7 | 0.0011 |
| 3 | 68 | 7 | Fair | 75.6 | 0.0007 |
| 4 | 93 | 44 | Good | 76.2 | 0.0001 |
| 5 | 95 | 24 | Fair | 75.6 | 0.0001 |
| 6 | 95 | 1 | Fair | 70.7 | 0.0007 |
| 7 | 96 | 4 | Fair | 75.9 | 0.0005 |
| 8 | 96 | 7 | Fair | 75.1 | 0.0008 |
| 9 | 96 | 24 | Fair | 74.8 | 0.0005 |
| 10 | 130 | 1 | Good | 76.3 | 0.0008 |
| 11 | 130 | 4 | Good | 76.0 | 0.0004 |
| 12 | 130 | 24 | Good | 74.6 | 0.0003 |
| 13 | 130 | 44 | Good | 76.7 | 0.0001 |
| 14 | 137.5 | 24 | Good | 75.9 | 0.0001 |

From the above table it will be noted that the improvement in the color of the flake also is accompanied by reduction in the iron content of the product. Thus, the original liquor contained approximately 0.0011 percent by weight of iron. Aging at the temperatures and for the time where an improvement in color was observed resulted in a reduction of the iron, frequently to as low as 0.0001 percent by weight.

Although the present invention has been described with reference to the specific details of certain embodiments, it is not intended that such details shall be regarded as limitations upon the scope of the invention except insofar as included in the accompanying claims.

What is claimed:

1. In the method of treating calcium chloride solution prepared by the ammonia-soda process and containing an impurity which, upon concentration of the calcium chloride solution, imparts a dark color to the solution, the improvement which comprises concentrating the calcium chloride solution to a concentration of not less than 30 percent by weight, removing suspended salts therein, heating the resulting product for a period in excess of one hour, and in excess of the time required to concentrate such solution to 55 percent by weight, at a temperature above 50° C. and until substantially complete precipitation of the dark colored impurity has taken place, and separating the precipitated impurity from the solution.

2. In the method of treating calcium chloride solution prepared by the ammonia-soda process and containing an impurity which, upon concentration of the calcium chloride solution, imparts a dark color to the solution, the improvement which comprises heating the aqueous calcium chloride solution for a period of at least 12 hours at a temperature above 50° C., including the time required for evaporation of the solution to a concentration above 30 percent by weight of calcium chloride, and until substantially complete precipitation of the dark colored impurity has occurred, and filtering the precipitated impurity from the solution.

3. In the method of treating aqueous calcium chloride solution prepared by the ammonia-soda process, the improvement which comprises heating the solution without appreciable concentration thereof for a period of at least one hour at a temperature above 50° C. and until substantially complete precipitation of dark colored impurity has largely taken place, and removing the precipitated impurity from the solution.

4. In the method of treating calcium chloride solutions prepared by the ammonia-soda process and containing an impurity which, upon concentration of the calcium chloride solution, imparts a dark color to the solution, the improvement which comprises concentrating the calcium chloride solution to a concentration of not less than 30 percent by weight, removing suspended salts therein, heating the resulting product at a temperature above 50° C. for a period in excess of one hour and for a period of time substantially longer than that required to effect evaporation of the solution to 40 to 55 percent concentration and until substantially complete precipitation of the dark colloidal impurity has taken place, and separating the precipitated impurity from the solution.

5. The process of claim 4 wherein the heating is continued for a period of at least 12 hours at a temperature above 50° C.

6. In the method of treating aqueous calcium chloride solution prepared by the ammonia-soda process and containing an impurity which, upon concentration of the calcium chloride solution, imparts a dark color to the solution, the improvement which comprises heating the calcium chloride solution at a temperature above 50° C. for a period in excess of 6 hours and long enough to substantially completely precipitate the dark colloidal impurity therein, and separating the precipitated impurity from the solution.

7. The process according to claim 6 wherein the period of heating is of the order of 3 to 7 days.

8. The process according to claim 6 wherein the solution is heated for at least one hour without appreciable concentration thereof.

References Cited in the file of this patent

UNITED STATES PATENTS

| 1,598,935 | Robison | Sept. 7, 1926 |
| 2,022,037 | Hanchett | Nov. 26, 1935 |
| 2,034,682 | Martin | Mar. 17, 1936 |
| 2,556,184 | Hedley | June 12, 1951 |